United States Patent [19]
Yoo

[11] Patent Number: 6,049,397
[45] Date of Patent: Apr. 11, 2000

[54] TECHNIQUE FOR PRINTING CALL-BACK INFORMATION IN A FACSIMILE MACHINE COMBINED WITH AUTOMATIC ANSWERING MACHINE

[75] Inventor: Si-Hun Yoo, Gumi, Rep. of Korea

[73] Assignee: SamSung Electronics Co., Ltd., Kyungki-do, Rep. of Korea

[21] Appl. No.: 09/016,353

[22] Filed: Jan. 30, 1998

[30] Foreign Application Priority Data

Jan. 30, 1997 [KP] DPR of Korea ............. 97-2755

[51] Int. Cl.$^7$ ..................................... H04N 1/00
[52] U.S. Cl. .................. 358/400; 358/468; 379/80
[58] Field of Search ............................. 379/89, 93.23, 379/100.01, 100.06, 100.08, 100.09, 40, 67, 70, 80; 358/400, 403, 405, 407, 435, 436, 438, 439, 440, 404, 434

[56] References Cited

U.S. PATENT DOCUMENTS

| | | | |
|---|---|---|---|
| 4,932,048 | 6/1990 | Kenmochi | 379/67 |
| 5,200,836 | 4/1993 | Koifumi | 358/434 |
| 5,283,818 | 2/1994 | Klausner | 379/67 |
| 5,287,201 | 2/1994 | Soumiya et al. | 358/400 |
| 5,379,276 | 1/1995 | Igami et al. | 369/32 |
| 5,384,830 | 1/1995 | Ide | 379/67 |
| 5,390,236 | 2/1995 | Klausner | 379/67 |
| 5,426,518 | 6/1995 | Ohyanagi | 358/296 |
| 5,459,581 | 10/1995 | Ohyanagi | 358/296 |
| 5,467,385 | 11/1995 | Reuben | 379/88 |
| 5,510,907 | 4/1996 | Koichi | 358/434 |
| 5,521,716 | 5/1996 | Itoh | 358/402 |
| 5,696,812 | 12/1997 | Ono | 379/88 |

FOREIGN PATENT DOCUMENTS

| | | | |
|---|---|---|---|
| 0 244 756 | 11/1987 | European Pat. Off. | H04M 11/06 |
| WO 95/06383 | 3/1995 | WIPO | H04M 11/00 |

*Primary Examiner*—Jerome Grant, II
*Attorney, Agent, or Firm*—Robert E. Bushnell, Esq.

[57] ABSTRACT

A facsimile machine including an automatic answering machine with a voice memory checks whether the facsimile is set to an automatic answering mode, upon receiving a ring signal of an incoming call. If the facsimile machine is set to the automatic answering mode, a check is made as to whether or not the voice memory is full. If the voice memory is full, the facsimile machine sends to a caller a memory-full status message requesting the caller to leave call-back information and prints out the received call-back information on a recording sheet. The call-back information is a telephone number of the caller. Therefore, in case of a long absence of the user, the facsimile machine may print out the telephone numbers of the callers on a recording sheet.

12 Claims, 2 Drawing Sheets

TECHNIQUE FOR PRINTING CALL-BACK INFORMATION IN A FACSIMILE MACHINE COMBINED WITH AUTOMATIC ANSWERING MACHINE

This application makes reference to, incorporates the same herein, and claims all benefits accruing under 35 U.S.C. § 119 from an application entitled Technique for Printing Call-Back Information in a Facsimile Machine combined with Automatic Answering Machine earlier filed in the Korean Industrial Property Office on Jan. 30, 1997, and there duly assigned Serial No. 97-2755 by that Office.

BACKGROUND OF THE INVENTION

1. Field of the Invention

The present invention relates to a facsimile with an automatic answering machine, and in particular, to a method for printing out call-back information on a recording sheet in case a voice memory is full.

2. Description of the Related Art

A facsimile machine combined with an automatic answering machine, which is set to an automatic answering mode during a user's absence, sends outgoing messages upon receiving an incoming call, and stores incoming messages from the calling party. After returning, the previous absent user may reproduce the incoming messages stored in the memory.

In a common digital automatic answering machine, the voice memory has a capability of storing 10–30 minutes of incoming messages. Thus, in case of the user's long absence, the voice memory may be full of the incoming messages from the callers. In such a case, the automatic answering machine can not store anymore incoming messages.

The following patents each disclose features in common with the present invention but do not teach or suggest a technique for printing call back information in a facsimile machine combined with an automatic answering machine in accordance with the present invention.

U.S. Pat. No. 5,459,581 to Ohyanagi, entitled, an Image Communication Method and Apparatus for Recording and Displaying Voice Message History Information, U.S. Pat. No. 5,510,907 to Koichi, entitled a Facsimile Apparatus Having Urgency Message Transmission Function, U.S. Pat. No. 5,384,830 to Ide, entitled an Apparatus with Selective Forwarding of Facsimile and Voice Communications, U.S. Pat. No. 5,426,518 to Ohyanagi, entitled an Image Communication Method and Apparatus for Recording and Printing Voice Message History Information, U.S. Patent No. 5,696,812 to Ono, entitled a Data Communication Apparatus Having a Function of Recording a Voice into a Memory, U.S. Pat. No. 5,390,236 to Klausner et al., entitled a Telephone Answering Device Linking Displayed Data with Recorded Audio Message, U.S. Pat. No. 5,467,385 to Reuben et al., entitled a Calling Number Display and Recording System, U.S. Pat. No. 5,283,818 to Klausner et al., entitled a Telephone Answering Device Linking Displayed Data with Recorded Audio Message, and U.S. Pat. No. 5,521,716 to Itoh, entitled a Data Storage Device Having a Selective Voice and Image Data Erasing Function.

SUMMARY OF THE INVENTION

It is therefore an object of the present invention to provide a technique for printing out call-back information on a recording sheet in case a voice memory is full.

According to an aspect of the present invention, a facsimile machine including an automatic answering machine with a voice memory checks whether the facsimile machine is set to an automatic answering mode, upon receiving a ring signal of an incoming call. If the facsimile machine is set to the automatic answering mode, a determination is made as to whether or not the voice memory is full. If the voice memory is full, the facsimile machine sends to a caller a memory-full status message which requests the caller to leave call-back information and prints out the received call-back information on a recording sheet. The call-back information refers to a telephone number of the caller.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail herein below with reference to the attached drawings.

Figure 1:
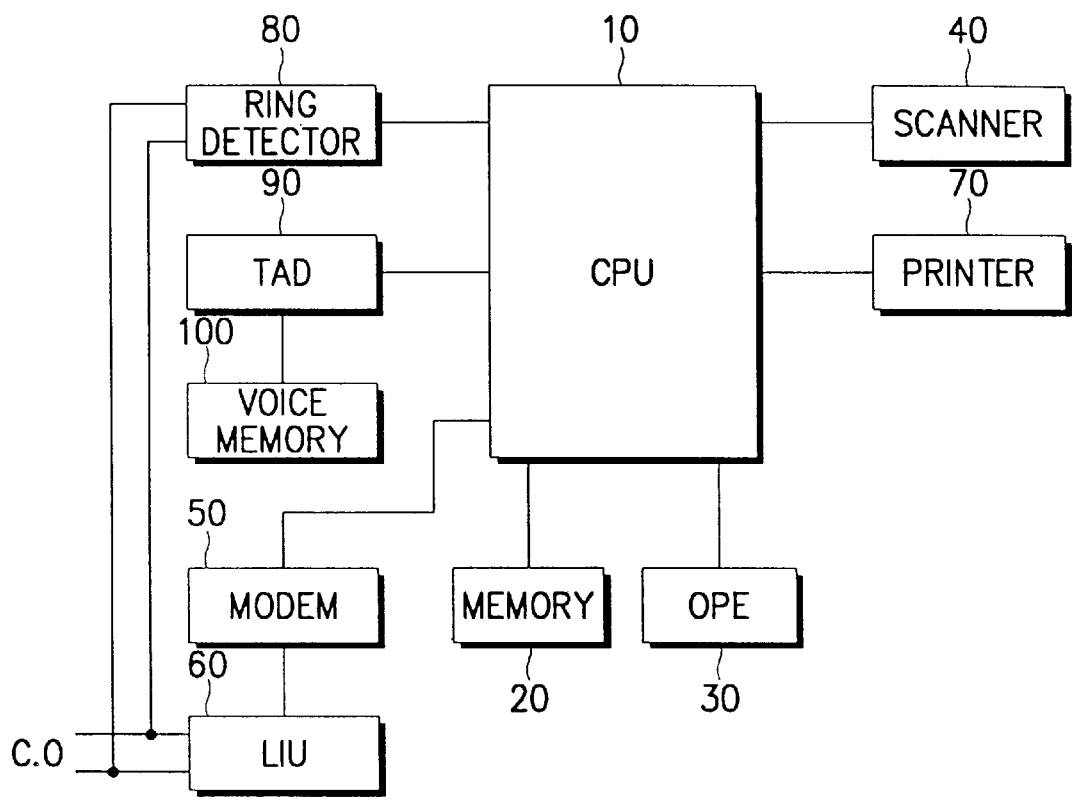
FIG. 1 is a block diagram of a facsimile machine combined with an automatic answering machine, to which the present invention is applicable.

Referring to FIG. 1, a facsimile machine is combined with an automatic answering machine. As illustrated, a central processing unit (CPU) 10 controls an overall operation of the facsimile machine according to a control program stored in a memory 20. In accordance with the present invention, the CPU 10 sends a memory-full status message to a caller and receives a telephone number of the caller to print it out on a recording sheet, in case a voice memory 100 is full in an automatic answering mode. The memory 20 stores the control program for the CPU 10, protocol data, and text data. An operating panel equipment (OPE) 30 has a number of keys for setting the automatic answering mode and generating various function key data. The key data generated is transferred to the CPU 10. Further, the operating panel equipment 30 has a display on which display data from the CPU 10 is displayed. A scanner 40 scans an original document to read an image and converts the image into binary data. A modem 50 modulates data output from the CPU 10 into an analog signal and/or demodulates an analog image signal from the caller, under the control of the CPU 10. Further, the modem 50 decodes a received DTMF signal and provides the coded DTMF data to the CPU 10. A line interface unit (LIU) 60 forms a communication loop under the control of the CPU 10, and interfaces the modem 50 with a central office line CO. A printer 70 prints out the image data on the recording sheet according to a printing command from the CPU 10. The voice memory 100 stores incoming messages (ICM) and outgoing messages (OGM). A telephone answering device (TAD) 90 sends the caller the outgoing messages stored in the voice memory 100 and/or stores the incoming messages from the callers into the voice memory 100, under the control of the CPU 10. A ring detector 80 detects a ring signal of an incoming call.

Figure 2:
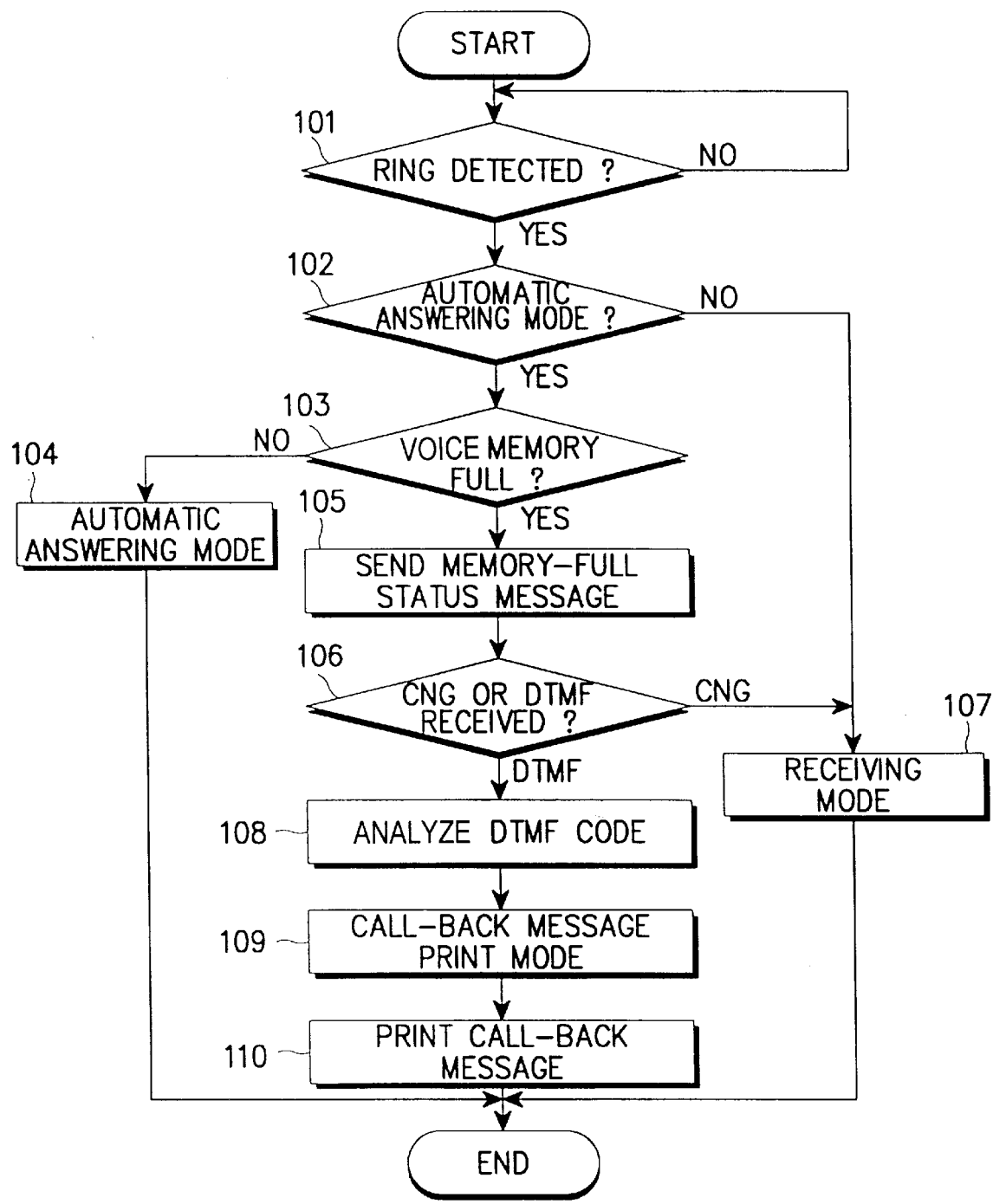
FIG. 2 is a flowchart for printing out call-back information on a recording sheet in case a voice memory is full, according to an embodiment of the present invention.

Now, referring to FIGS. 1 and 2, operation of the preferred embodiment of the invention will be described in detail. The CPU 10 checks at a step 101 whether the ring detector 80 has detected a ring signal of an incoming call. If the ring signal is detected, the CPU 10 checks at a step 102 whether the facsimile machine is set to an automatic answering mode. If the facsimile machine is not set to the automatic answering mode, the procedure proceeds to a step 107 to perform a receiving mode of the facsimile machine. However, if it has been determined that the facsimile machine is set to the automatic answering mode at the step 102, the CPU 10 checks at a step 103 whether the voice memory 100 is full of incoming messages. If the voice memory 100 is not full, the telephone answering device 90 sends the outgoing message stored in the voice memory 100 and stores an incoming message received from the caller in the voice memory 100, under the control of the CPU 10 in step 104. That is, the facsimile performs a normal automatic answering mode operation. However, if the voice memory 100 is full at the step 103, the telephone answering device 90 will send the caller a memory-full status message, such as "I am out for a moment. Please, leave your telephone number after a beep tone", at a step 105, under the control of the CPU 10. Then, at a step 106, the CPU 10 checks whether or not a calling tone (CNG) or a DTMF signal is received. If the calling tone is detected, the procedure goes to the step 107 to perform the receiving mode of the facsimile machine. Instead, if the DTMF signal for call-back information (i.e., a telephone number of the caller) is received, the CPU 10 analyzes at a step 108 a DTMF code received from a DTMF receiver (not shown) disposed within the modem 50. Then, at a step 109, the CPU 10 sets the facsimile machine to a call-back information print mode. At a step 110, the printer 70 prints out on the recording sheet the call-back information, i.e., the telephone number that the caller has left, under the control of the CPU 10. The returning user may recognize the call-back information and dial the telephone number to make a return call to the caller.

In the light of the foregoing descriptions, the facsimile machine according to the present invention prints out the call-back information (i.e., the telephone number of the calling party) on the recording sheet in case the voice memory is full of previous incoming messages. Thus, the returning user can recognize a reception of the call-back information and call back to the calling party.

Although a preferred embodiment of the present invention has been described in detail herein above, it should be clearly understood that many variations and/or modifications of the basic inventive concepts herein taught which may appear to those skilled in the art will still fall within the spirit and scope of the present invention.

What is claimed is:

1. A method of printing call-back information in a facsimile machine including an automatic answering machine with a voice memory, comprising the steps of:

checking whether the facsimile machine is set to an automatic answering mode, upon receiving a ring signal of an incoming call;

checking whether said voice memory is full, when the facsimile machine is determined to be set to said automatic answering mode;

sending to a caller a memory-full status message requesting the caller to leave call-back information, when it is determined that said voice memory is full; and printing out said call-back information on a recording sheet.

2. A method of printing call-back information according to claim 1, said call-back information comprising a DTMF dual tone multi frequency signal.

3. A method of printing call-back information according to claim 1, said call-back information comprising a telephone number of said caller.

4. A method of printing call-back information according to claim 1, further comprising the step of performing a receiving mode of the facsimile machine, if the facsimile machine is determined not to be set to said automatic answering mode.

5. An apparatus for printing call-back information in a facsimile machine including an automatic answering machine with a voice memory, comprising:

a mode checking means for checking whether the facsimile machine is set to an automatic answering mode, upon receiving a ring signal of an incoming call;

a memory checking means for checking whether said voice memory is full, when the facsimile machine is determined to be set to said automatic answering mode;

a means for sending to a caller a memory-full status message requesting the caller to forward call-back information, when it is determined that said voice memory is full by said memory checking means; and a printer for printing out said call-back information on a recording sheet.

6. The apparatus for printing call-back information according to claim 5, said call-back information forwarded by said caller comprising a DTMF dual tone multi frequency signal.

7. The apparatus for printing call-back information according to claim 5, said call-back information forwarded by said caller comprising a telephone number of said caller.

8. The apparatus for printing call-back information according to claim 5, further comprising a means for causing a facsimile machine to perform a receiving mode of the facsimile machine, if the facsimile machine is determined not to be set to said automatic answering mode by said mode checking means.

9. An apparatus for printing call-back information in a facsimile machine including an automatic answering machine with a voice memory comprising:

a ring detector for detecting a ring signal of an incoming call;

a telephone answering device for receiving and transmitting voice messages, the voice memory storing the incoming and outgoing voice messages;

a line interface unit connected to a modulator the modulator (modem) for interfacing a telephone line with the facsimile machine;

a scanner for scanning an original document to read an image and convert the image into binary data;

a printer for printing out image data on a recording sheet;

a central processing unit for interfacing with said ring detector, said telephone answering device, said modem, said scanner, and said printer;

a memory connected to said central processing unit for storing a control program for the central processing unit;

an operating a panel equipment comprising a number of keys for inputting key data and further comprising a display for displaying data;

said central processing unit checking whether the facsimile machine is set to an automatic answering mode upon receiving a ring signal of a incoming call detected by said ring detector;

said central processing unit checking whether said voice memory is full when said central processing unit has determined that the facsimile machine is set to the automatic answering mode;

said telephone answering device sending to a caller a memory-full-status message requesting the caller to forward call-back information when said central processing unit has determined that said voice memory is full; and said printer printing out said call-back information on a recording sheet.

10. The apparatus for printing call-back information according to claim 9, said call-back information forwarded by said caller comprising a DTMF dual tone multi frequency signal.

11. The apparatus for printing call-back information according to claim 9, said call-back information forwarded by said caller comprising a telephone number of said caller.

12. The apparatus for printing call-back information according to claim 9, further comprising a means for causing a facsimile machine to perform a receiving mode of the facsimile machine, if the facsimile machine is determined not to be set to said automatic answering mode by said central processing unit.

* * * * *